United States Patent [19]

Schröder et al.

[11] Patent Number: 4,835,031

[45] Date of Patent: May 30, 1989

[54] PROFILED STRIP WITH SMOOTH REINFORCING INSERT AND METHOD OF ITS MANUFACTURE

[75] Inventors: Franz Schröder, Hückswagen; Gerd Strutz, Schwelm, both of Fed. Rep. of Germany

[73] Assignee: Gebr. Happich GmbH, Fed. Rep. of Germany

[21] Appl. No.: 166,991

[22] Filed: Mar. 11, 1988

[30] Foreign Application Priority Data

Mar. 19, 1987 [DE] Fed. Rep. of Germany ....... 3708889

[51] Int. Cl.⁴ .................................................. B32B 3/10
[52] U.S. Cl. ..................................... 428/122; 428/136; 428/138; 428/140
[58] Field of Search ................. 428/31, 122, 138, 136, 428/140; 49/490; 52/716

[56] References Cited

U.S. PATENT DOCUMENTS 3,222,769 12/1965 Plae .......................................... 49/490

Primary Examiner—Alexander S. Thomas
Attorney, Agent, or Firm—Ostrolenk, Faber, Gerb & Soffen

[57] ABSTRACT

A method for producing a profiled strip and the resulting profiled strip, wherein the profiled strip comprises a flexurally elastic reinforcement insert deformed, for example, into a U-shape, covered by a covering of rubber, or the like which is preferably extruded over the insert. The insert is a metal strip which is stamp cut for defining a continuous web extending across the strip and for defining at least one plurality of rungs in the metal strip. The rungs extend away from the web and preferably are defined on both opposite sides of the web. The rungs are defined by a stamp cutting operation so that after the insert is smoothed following the stamp cutting, there is no spacing between neighboring edges of adjacent rungs.

11 Claims, 1 Drawing Sheet

PROFILED STRIP WITH SMOOTH REINFORCING INSERT AND METHOD OF ITS MANUFACTURE

BACKGROUND OF THE INVENTION

The present invention relates to a method of producing a profiled strip consisting of rubber, or the like, the strip having at least one flexurally elastic reinforcing insert and relates to the insert itself. The profiled strip has particular application for use on automotive vehicles. Such a strip includes at least one flexurally elastic reinforcing insert. The insert has at least one continuous web across it and a plurality of rungs defined in the insert and extending away from the web and arranged alongside of each other extending transverse to the longitudinal axis of the profiled strip. The insert is produced from at least one metal strip or band. Rubber, or the like strip covering material, is molded around the insert by extrusion.

Known reinforced profiled strips of rubber, or the like, which include a flexible reinforcing insert, are sometimes referred to as skeleton strips. The strips have varied forms and applications, particularly in vehicles. Such profiled strips are used, for instance, as sealing, window-guide, shaft-sealing, edge protection, covering or for similar profiled strip purposes. The profiled strips have flexible, flexurally elastic, reinforcing inserts which are generally of metal.

There are various methods of producing the reinforcing inserts and thus there are different reinforcing inserts. The classic insert is a lattice strip having at least one continuous web of material. On one or both lateral sides of the web, rungs are arranged extending away from the web and alongside of each other. The web and the rungs are formed through windowlike openings that are punched out of a strip-shaped starting material.

In another known method, a strip-shaped starting material is slit and then stretched so that, again, windowlike openings are produced from the slits. In the manufacture of profiled strips which are reinforced with reinforcing inserts and which must be subjected to a bending process upon mounting, windowlike stampings or openings have been required in the reinforcing inserts. This enables the profiled strips to be easily bent and assures bonding of the rubber material of the profiled strips through the holes of the stamping. For these reasons, an unsatisfactory quality of the surface of the profiled strip has been tolerated or a satisfactory surface quality of the profiled strip could be obtained by subsequently covering the profiled strip with a textile material, or the like. However, an additional covering requires a considerable expense for manufacture and substantially increased manufacturing costs. The unsatisfactory surface quality and appearance of traditional profiled strips occurs because the rungs of the reinforcing insert, which extend transversely to the longitudinal axis of the profiled strip, are visible on the outside of the body of the profiled strip.

SUMMARY OF THE INVENTION

The object of the present invention is to improve the production of flexible profiled strips to satisfy technical and aesthetic requirements and at a comparatively low cost. It is a further object of the invention to provide a profiled strip which is simple, inexpensive to manufacture and of improved appearance.

According to the invention, the metal strip or band for the reinforcing insert is stamp cut with rungs arranged, without spacing between them alongside of each other, so as to form at least one continuous web and a plurality of rungs extending in the insert away from the web. This rung arrangement provides increased flexural elasticity to the insert while no free spaces are present between the rungs instead rest close against each other. The rungs are arranged alongside of each other on the web without spacing between them. In this case, the rungs are, on the one hand, preferably separated from each other by cuts made in the metal band. On the other hand, their cut edges rest free of spacing against each other. The rungs can be arranged on either one side or on both sides of the web of the strip.

The metal strip or band, which is divided into web(s) and rungs, is rolled smooth after it has been stamp cut. The resulting reinforcing insert has smooth and continuous outer surfaces. After the reinforcing insert is sprayed around with a rubber, or the like, covering material, no irregularities are present on the finished profiled strip. The profiled strip produced by this method has smooth surfaces, which have for a long time been in demand by consumers.

A reliable bond between the reinforcing insert and the rubber or similar covering material defining the profiled strip can be obtained by applying a coupling agent on both sides of the reinforcing insert.

One embodiment of the invention is explained further below with reference to the drawings.

DESCRIPTION OF A PREFERRED EMBODIMENT

Figure 1:
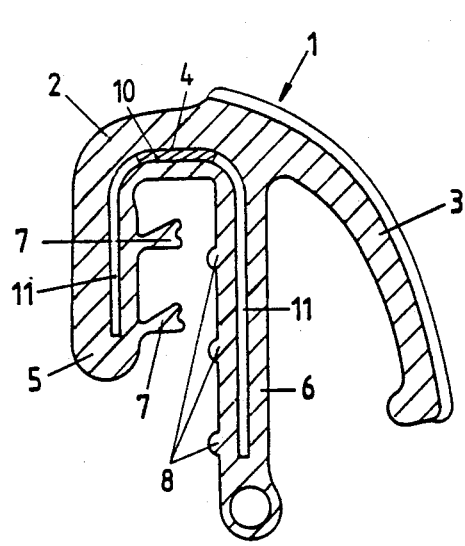
FIG. 1 is a cross-sectional view of a profiled strip developed as an automotive vehicle window guide profile.

The profiled strip 1 shown in FIG. 1 is shaped as a window guide profile of an automotive vehicle. The strip 1 has an approximately U-shaped main part 2. A sealing lip 3 is formed on the main part and projects away from the web of the main part 2. A reinforcing insert 4 is incorporated into the main part 2. The U-shaped main part 2 can be placed on a car-body flange (not shown) which, for instance, surrounds a window cutout. It is held on the body flange in a reliable manner by flexible holding lips 7 and by opposite projections 8 which are developed on the inner sides of the legs 5, 6, respectively, of the main part 2.

Figure 4:
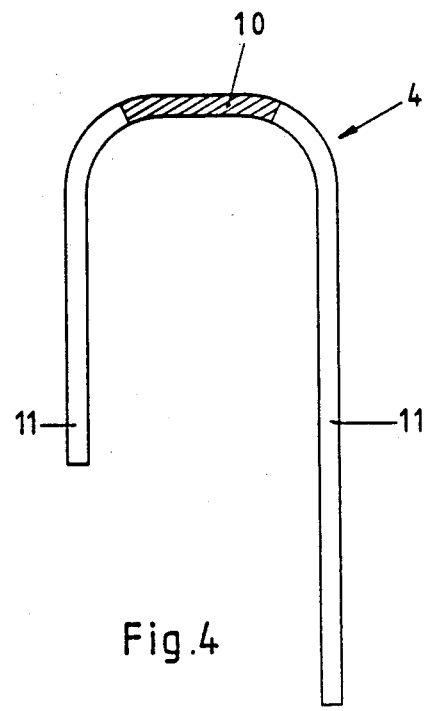
FIG. 4 is a cross-sectional view of the insert after its fabrication.
Figure 2:
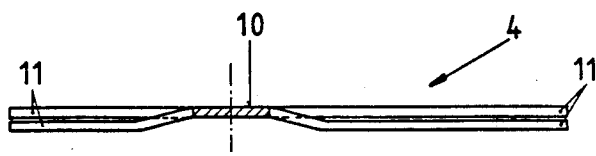
FIG. 2 is a cross-section through the reinforcing insert to be incorporated into the profiled strip of FIG. 1 during a stage in the fabrication of the insert.

The reinforcing insert 4 is shown in further detail in FIGS. 2 and 4. It comprises a stamp cut metal strip or band 9. The metal band is thin in its thickness and is deformable for bending to profile the band and the profiled strip having a smooth, effectively continuous surface after it has been completed. The metal band 9 as a continuous unbroken web 10 extending in its longitudinal direction. On at least one, and as illustrated, preferably on both lateral sides of the web 10, rungs 11 are formed. These are cut free from and directed perpendicular to the web 10. The inward edges of each rung is at and defines the edge of the web 10 and is not cut free of the insert there. The rungs are seated, practically without interrung spacing, alongside of each other. The nearly spacing free arrangement of the rungs 11 results from their being separated merely by a stamping cut and not by a punched opening. Upon manufacture of the reinforcing insert 4, the metal band 9 is accordingly provided in a continuous process with stamping cuts 12 to produce the continuous web 10 and the rungs 11 on both sides of the web.

Figure 3:
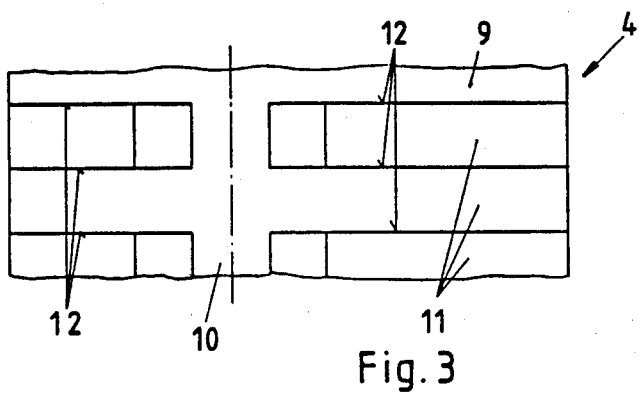
FIG. 3 is a plan view of the reinforcing insert during fabrication.

The stamping cuts, seen from above in FIG. 3, produce certain deformations of the metal band 9, particularly at the rungs, as seen in FIG. 2. The deformations are eliminated simply. Before the metal band is profiled or bent, as seen in FIG. 4, it is rolled smooth, so that the web 10 and the rungs 11 lie in the same plane. Then the insert is bent, e.g. as shown in FIGS. 1 and 4.

To manufacture a profiled strip of the type shown, for instance, in FIG. 1, a reinforcing insert 4 is produced from a metal strip or band, as described above with reference to FIGS. 2 to 4. The insert is then coated on both sides with a coating of a coupling agent. The reinforcing insert 4 is next conducted through a cross-head extruder where rubber, or an appropriate plastic, or similar covering material is sprayed and/or extruded around it. This produces a profiled strip which has a smooth outer surface and particularly good appearance but which nevertheless has a flexural elasticity which fully satisfies the technical requirements for the profiled strip.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A profiled strip of covering material, comprising:
   a flexurally elastic reinforcing insert which is thin in thickness and deformed for deformed for defining a profile; the insert being out through for defining a continuous uncut web extending in one direction over the insert and for further defining a plurality of rungs defined in the insert and extending laterally from the web, the rings being arranged alongside each other and so close together as to be essentially without spacing between adjacent rungs;
   a covering over the insert, covering the insert and defining the exterior of the profiled strip.

2. The profiled strip of claim 1, wherein the insert is deformed generally U-shaped.

3. The profiled strip of claim 1, wherein the deformed shape of the insert is the cross-sectional shape thereof and the web extends over the strip and through the cross-sections.

4. The profiled strip of claim 1, wherein the insert is comprised of metal.

5. The profiled strip of claim 1, wherein the cuts through the insert for defining the rungs are generally all parallel.

6. The profiled strip of claim 1, wherein the rungs are defined by cuts through the strip and the strip is smooth so that the edges of adjacent rungs lie without spacing against each other.

7. The profiled strip of claim 1, wherein the rungs are defined on at least one side of the continuous web.

8. The profiled strip of claim 1, wherein the rungs are defined on each of the opposite sides of the continuous web.

9. The profiled strip of claim 1, further comprising a coating of coupling agent on the insert disposed between the insert and the covering.

10. The profiled strip of claim 1, wherein the covering is of rubber.

11. The profiled strip of claim 1, wherein the covering is of a plastic material.

* * * * *